(12) United States Patent
Neubauer et al.

(10) Patent No.: US 11,072,275 B2
(45) Date of Patent: Jul. 27, 2021

(54) SYSTEMS AND METHODS FOR PORTABLE HEADLAMP LEVELING DEVICE

(71) Applicant: Toyota Motor Engineering & Manufacturing North America, Inc., Plano, TX (US)

(72) Inventors: Daniel T. Neubauer, Ann Arbor, MI (US); Stuart R. Wuerthele, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/574,207

(22) Filed: Sep. 18, 2019

(65) Prior Publication Data
US 2021/0078483 A1 Mar. 18, 2021

(51) Int. Cl.
*B60Q 1/115* (2006.01)
*B60Q 1/00* (2006.01)

(52) U.S. Cl.
CPC ............ *B60Q 1/115* (2013.01); *B60Q 1/0023* (2013.01); *B60Q 2300/11* (2013.01); *B60Q 2300/132* (2013.01); *B60Q 2300/324* (2013.01); *B60Q 2900/30* (2013.01)

(58) Field of Classification Search
CPC .. B60Q 1/115; B60Q 1/0023; B60Q 2300/11; B60Q 2300/132; B60Q 2300/324; B60Q 2900/30
USPC .................................................. 356/121–127
See application file for complete search history.

(56) References Cited

U.S. PATENT DOCUMENTS

| 5,078,490 | A | * | 1/1992 | Oldweiler | ............ G01M 11/067 33/288 |
| 6,445,085 | B1 | | 9/2002 | Toda et al. | |
| 9,896,022 | B1 | * | 2/2018 | Pertsel | ................... H04N 7/183 |
| 9,969,319 | B2 | | 5/2018 | George et al. | |
| 2002/0057573 | A1 | * | 5/2002 | Kondo | ................... B60Q 1/115 362/465 |

(Continued)

FOREIGN PATENT DOCUMENTS

| DE | 102004012527 A1 | 10/2004 |
| JP | 3849829 B2 | 11/2006 |
| JP | 4757427 B2 | 8/2011 |

OTHER PUBLICATIONS

Adjusting headlights with phone (https://www.youtube.com/watch?reload=9&v=1M_xLuw82lc); published Mar. 2016.

(Continued)

*Primary Examiner* — Tri T Ton
(74) *Attorney, Agent, or Firm* — Dinsmore & Shohl, LLP

(57) ABSTRACT

Methods and systems for leveling a headlamp of a vehicle on a ground surface using a portable device may include determining, by a processor and a leveling software application tool of the portable device, a zero reference earth plane of the ground surface on which the vehicle is disposed, setting the zero reference earth plane as a vehicle longitudinal axis of the vehicle with respect to the ground surface, determining a current illumination axis of the headlamp based on a feedback from the headlamp received by the portable device, and generating a calibration level angle based on a comparison of the vehicle longitudinal axis and the current illumination axis.

18 Claims, 3 Drawing Sheets

(56) References Cited

U.S. PATENT DOCUMENTS

2019/0359118 A1* 11/2019 Spenner ................ B60Q 1/076

OTHER PUBLICATIONS

Adjust Headlights with the CAR ASYST App (https://blog.car-asyst.com/blog/2018/07/19/adjust-headlights-with-the-car-asyst-app/); published Jul. 19, 2018.

* cited by examiner

SYSTEMS AND METHODS FOR PORTABLE HEADLAMP LEVELING DEVICE

TECHNICAL FIELD

The present specification generally relates to a portable headlamp leveling device and, more specifically, to systems and methods of use for a portable headlamp leveling device to use a software application on the device to determine a calibration leveling angle for a vehicle headlamp.

BACKGROUND

Headlamp aiming accuracy, such as for headlamp low beams, impacts the overall performance of headlamps of a vehicle when in use. Too high a headlamp angle on a vehicle can affect vision of other oncoming traffic glare, while too low a headlamp angle may not provide sufficient forward illumination of the road for a driver of the vehicle.

Accordingly, a need exists for devices and tools to determine accurate headlamp low beam aim for a vehicle, and systems and methods of use of such devices and tools.

SUMMARY

In one embodiment, a method for leveling a headlamp of a vehicle on a ground surface using a portable device may include determining, by a processor and a leveling software application tool of the portable device, a zero reference earth plane of the ground surface on which the vehicle is disposed, and setting the zero reference earth plane as a vehicle longitudinal axis of the vehicle with respect to the ground surface. The method may further include based on a placement of the portable device in front of the headlamp, determining a current illumination axis of the headlamp, and generating a calibration level angle based on a comparison of the vehicle longitudinal axis and the current illumination axis.

In another embodiment, a system for leveling a headlamp of a vehicle on a ground surface may include a portable device, a leveling software application tool installed in the portable device, and a processor communicatively coupled to the portable device, the leveling software application tool, and a non-transitory computer storage medium. The non-transitory computer storage medium stores instructions that, when executed by the processor, cause the processor to: determine, by the processor and the leveling software application tool of the portable device, a zero reference earth plane of the ground surface on which the vehicle is disposed; set the zero reference earth plane as a vehicle longitudinal axis of the vehicle with respect to the ground surface; based on a placement of the portable device in front of the headlamp, determine a current illumination axis of the headlamp; and generate a calibration level angle based on a comparison of the vehicle longitudinal axis and the current illumination axis.

In yet another embodiment, a system for leveling a headlamp of a vehicle on a ground surface may include a leveling software application tool configured for installation in a portable device, and a processor communicatively coupled to the leveling software application tool and a non-transitory computer storage medium. The non-transitory computer storage medium stores instructions that, when executed by the processor, cause the processor to: determine, by the processor and the leveling software application tool when installed in the portable device, a zero reference earth plane of the ground surface on which the vehicle is disposed; set the zero reference earth plane as a vehicle longitudinal axis of the vehicle with respect to the ground surface; based on a placement of the portable device in front of the headlamp, determine a current illumination axis of the headlamp; generate a calibration level angle based on a comparison of the vehicle longitudinal axis and the current illumination axis; determine a calibration level angle range based on the calibration level angle and a tolerance with respect to the vehicle longitudinal axis; and display the calibration level angle range on a graphical user interface of the leveling software application tool.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to a leveling software application tool for a portable device to level a headlamp of a vehicle on a ground surface and methods utilizing the leveling software application tools and systems described herein. Various embodiments of leveling software application tools and methods of use for such leveling software application tools are described in detail herein.

Figure 1:
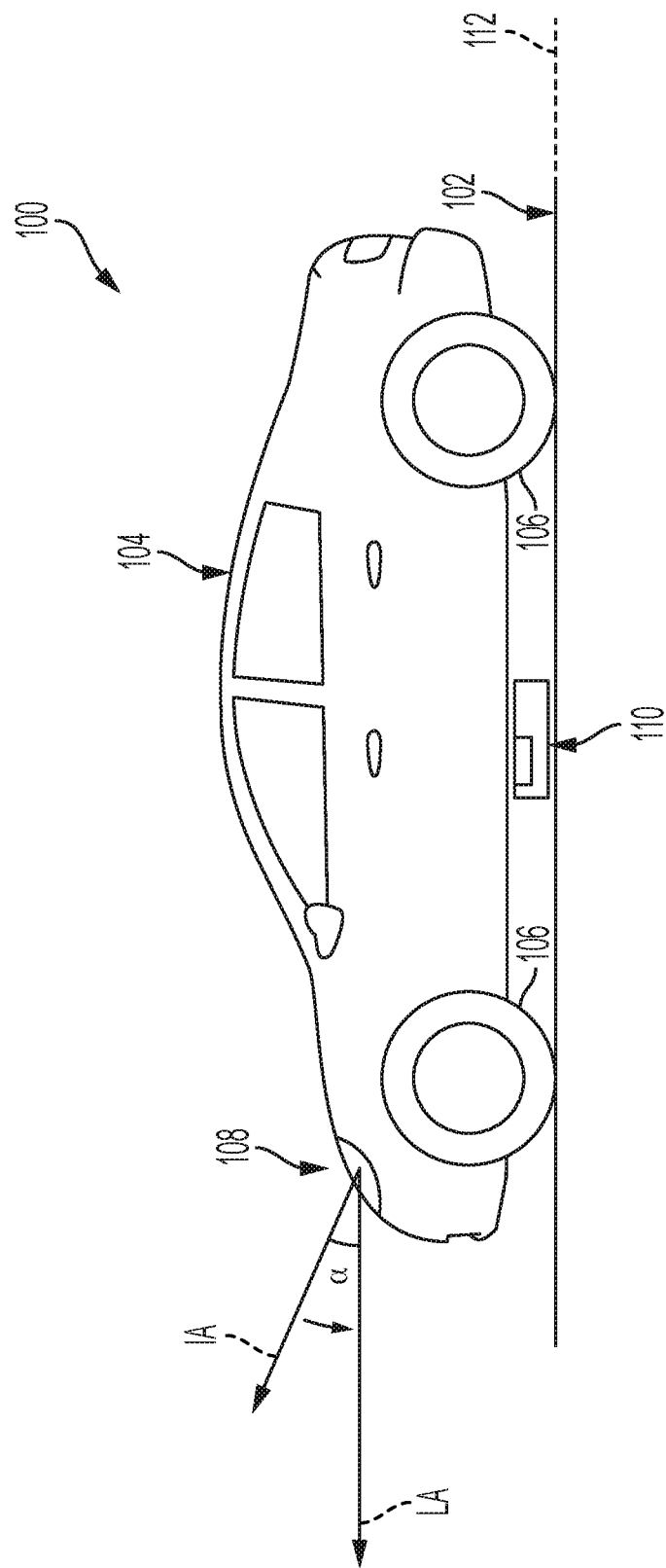
FIG. 1 illustrates a vehicle with a vehicle headlamp and a portable headlamp leveling device to determine a calibration leveling angle for the vehicle headlamp, according to one or more embodiments shown and described herein.

Referring to FIG. 1, a leveling system 100 includes a vehicle 104 with one or more tires 106 disposed on a ground surface 102. The vehicle 104 includes a headlamp 108 that may be a low beam headlamp. The leveling system 100 further includes a portable device 110 (e.g., a portable handheld computing device). The portable device 110 may include a headlamp leveling software application tool 312 (FIG. 3) to determine a zero reference earth plane 112, a vehicle longitudinal axis LA, a current illumination axis IA, and a calibration level angle α based on a comparison of the vehicle longitudinal axis LA and the current illumination axis IA, as described in greater detail further below.

Figure 2:
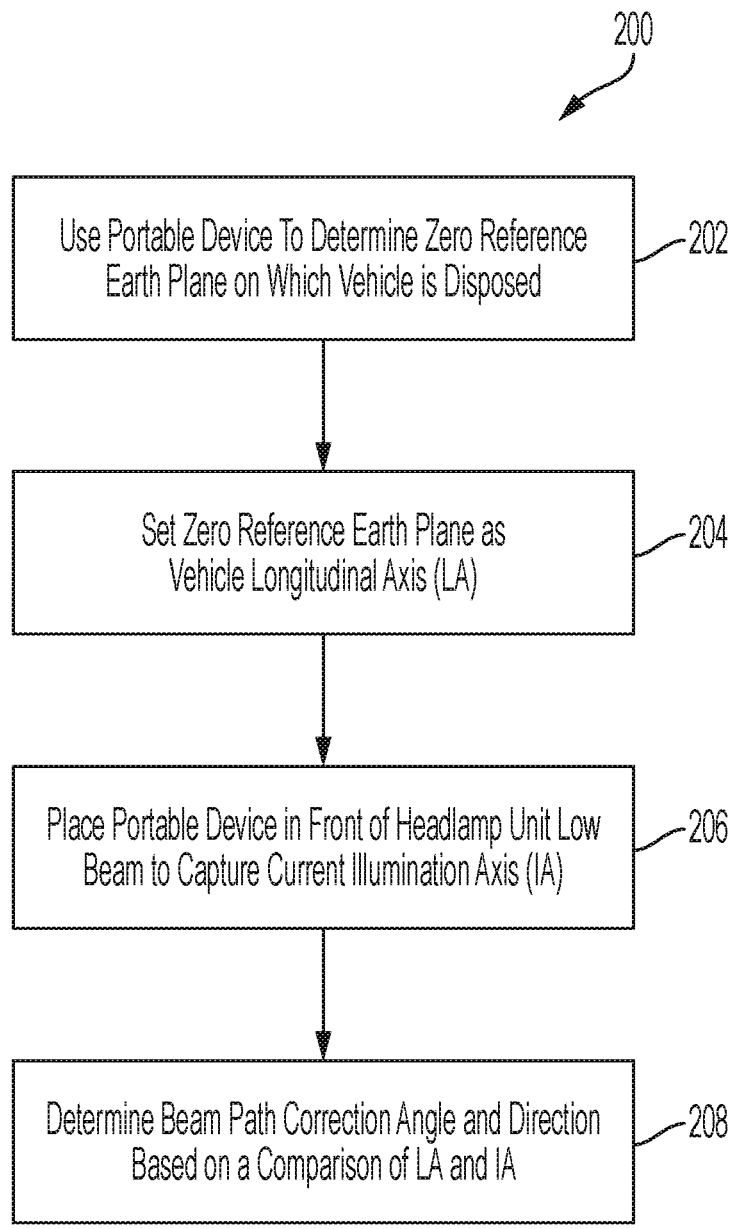
FIG. 2 is a flow chart of a calibration level angle determination process utilizing the device of FIG. 1, according to one or more embodiments shown and described herein.
Figure 3:
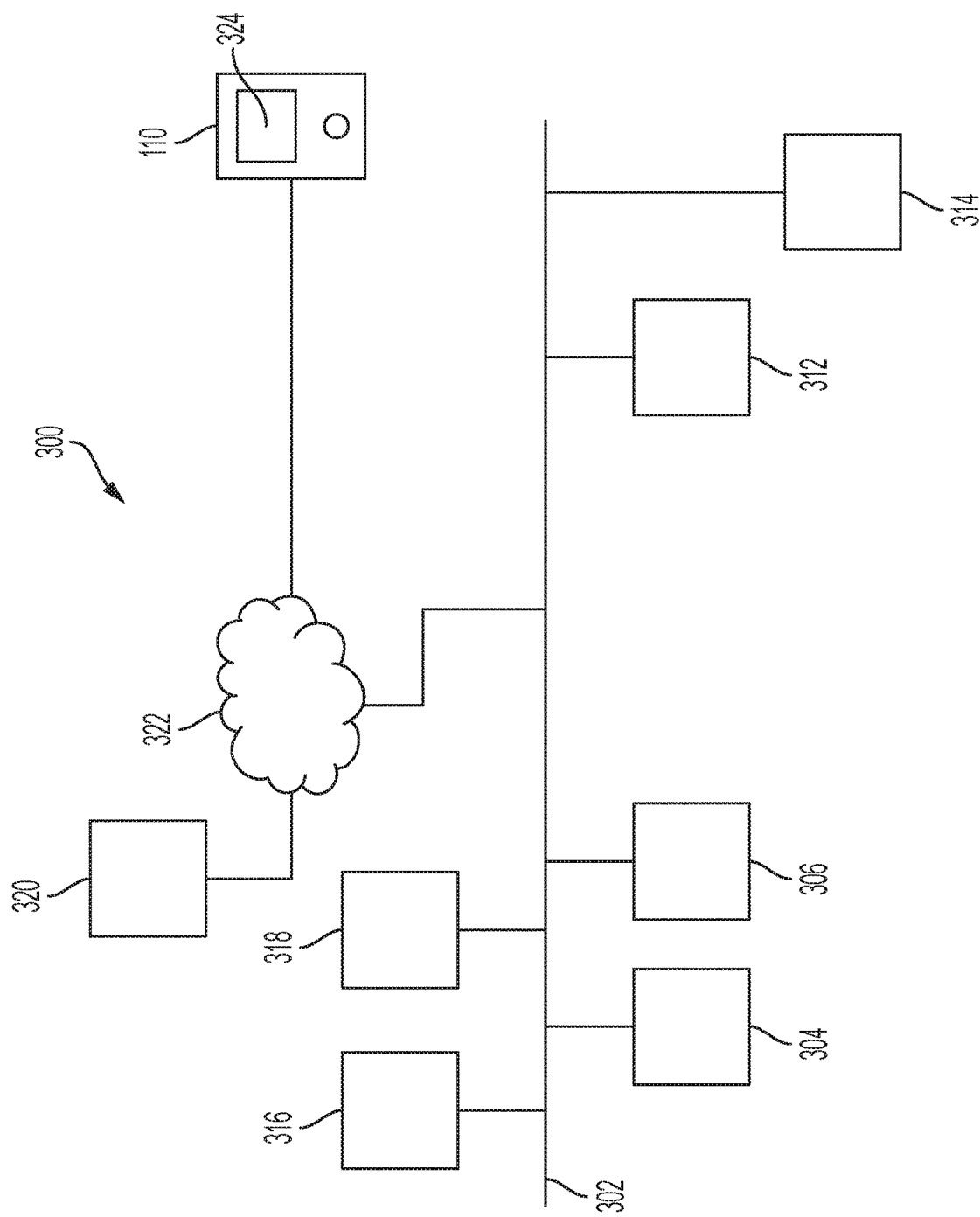
FIG. 3 schematically illustrates a system for implementing computer and software based methods to apply a calibration level angle determination process with the device of FIG. 1, according to one or more embodiments shown and described herein.

As a non-limiting example, a calibration level angle determination process 200 of FIG. 2 for leveling the headlamp 108 of a vehicle on a ground surface using the portable device 110 of FIGS. 1 and 3 may in block 202 determine, by a processor 304 (FIG. 3) and a leveling software application tool 312 of the portable device 110, a zero reference earth plane 112 of the ground surface 102 on which the vehicle 104 is disposed. Thus, the portable device 110 is used to determine the zero reference earth plane 112 on which the vehicle 104 is disposed.

In embodiments, determination of the zero reference earth plane 112 may include generating a tire earth plane position based on positioning of the portable device 110 adjacent to each tire 106 of the vehicle 104, determining a plane of tire alignment with respect to the ground surface 126 based on each tire earth plane position, and setting the zero reference earth plane 112 to the plane of tire alignment. In embodiments, center points of the tires may be used to generate each tire earth plane position, and a plane of tire alignment may be rotated to be parallel to horizontal to align tire center points and accommodate for tires of different heights. Additionally or alternatively, determination of the zero reference earth plane 112 may include disposing the portable device 110 on the ground surface 126 adjacent the vehicle 104 and/or setting the portable device 110 on a floor of the vehicle 104, generating a horizontal plane reading of the portable device 110, and setting the zero reference earth plane 112 to the horizontal plane reading.

In block 204, the zero reference earth plane 112 is set to the vehicle longitudinal axis LA. In particular, the zero reference earth plane 112 is set as the vehicle longitudinal axis LA of the vehicle 104 with respect to the ground surface 102.

In block 206, based on a placement of the portable device 110 in front of the headlamp 108, the current illumination axis IA of the headlamp 108 is determined. In embodiments, based on a feedback from the headlamp 108 received by the portable device 110, the current illumination axis IA. The portable device 110 may be placed in front of the a headlamp unit low beam of the headlamp 108 to capture the current illumination axis IA. The portable device 110 may be configured to receive feedback from a leveling sensor on the headlamp 108 to determine the current illumination axis IA. The feedback from the leveling sensor may initialize to a 'zero' value as the determined current illumination IA to compare to the vehicle longitudinal axis LA (e.g., as the LA of a ground plane).

In block 208, the calibration level angle α may be generated based on a comparison of the vehicle longitudinal axis LA and the current illumination axis IA. Thus, a beam path correction angle as the calibration level angle α as well as a direction of correction, whether positive to indicate an upward direction or negative to indicate a downward direction, may be determined based on a compared difference in angle and direction of the vehicle longitudinal axis LA and the current illumination axis IA.

In embodiments, a calibration level angle range may be determined based on the calibration level angle α and a tolerance with respect to the vehicle longitudinal axis LA. In embodiments, the tolerance may be within ±0.10 degrees, ±0.15 degrees, ±0.20 degrees, ±0.70 degrees, ±0.76 degrees, or ±1.00 degrees of the vehicle longitudinal axis LA. Additionally or alternatively, the tolerance may be within a range of +5 cm to −15 cm or within ±10 cm of the vehicle longitudinal axis LA. The tolerance and a nominal aim may be predetermined and stored within a database 314 (FIG. 3) communicatively coupled to the processor 304 of the portable device 110. Further, the nominal aim and tolerance may be based on a vehicle type. An original equipment manufacturer (OEM) or other user or entity may upload the tolerance and a desired nominal vehicle longitudinal axis into the database 314 based on vehicle type. As a non-limiting example, the desired tolerance range for a 2019 Toyota Camry may be ±0.15 degrees of the vehicle longitudinal axis LA.

Further, the vehicle longitudinal axis LA determined by the leveling software application tool 312 may be set based on a predetermined nominal vertical aim of a desired illumination axis such that the desired illumination axis is not necessary parallel to horizontal. By way of example, and not as a limitation, a guideline SAE J599 of the Society of Automobile Engineers (SAE), which is incorporated by reference in its entirety herein, provides suggested headlamp aim ranges with respect to a distance of 25 feet, as set forth in the attached TABLE 1:

TABLE 1

| SAE J599 GUIDELINE | | |
|---|---|---|
| Headlamp (centerline) Mounting Height | Nominal Vertical Aim | Aim Inspection Limits for Vertical Aim |
| 56 to 90 cm (22 to 36 in) | 0 Vertical | 10 cm (4 in) Up to 10 cm (4 in) Down |
| 90 to 120 cm (36 to 48 in) | 5 cm (2 in) Down | 5 cm (2 in) Up to 15 cm (6 in) Down |
| 120 to 140 cm (48 to 54 in) | 6.4 cm (4 in) Down | 4 cm (1.5 in) Up to 16.5 cm (6.5 in) Down |

In TABLE 1 above, a nominal vertical aim and corresponding aim inspection limits are set depending on a mounting height of the headlamp 108 on the vehicle 104 with respect to ground. The vehicle longitudinal axis LA as determined and set by the leveling software application tool 312 as described herein may be set to a predetermined nominal vertical aim of a desired illumination axis, such as the nominal vertical aims based on mounting height of TABLE 1. The predetermined nominal vertical aim may be, for example, −5 cm of horizontal or −6.4 cm of horizontal, the negative direction indicative of a downward direction with respect to horizontal when the vehicle 104 is parallel to horizontal.

The process 200 may further include one of an automatic or manual adjustment of the current illumination axis IA of the headlamp 108 based on the calibration level angle α. In embodiments, the calibration level angle range may be determined based on the calibration level angle α and a tolerance with respect to the vehicle longitudinal axis LA, and the current illumination axis of the headlamp may be one of automatically or manually adjusted based on the calibration level angle range. Further, the calibration level angle range may be transmitted, such as through a sensor 316 (FIG. 3) that may be configured for wireless Bluetooth® transmission, to a headlamp leveling actuator coupled to the headlamp 108, and the current illumination axis IA of the headlamp 108 may be automatically adjusted based on the calibration level angle range to within an acceptable tolerance range of the vehicle longitudinal axis LA. The automatic adjustment by the headlamp actuator of the headlamp 108 based on the calibration level angle range transmission may be monitored by the leveling software application tool 312. The headlamp leveling actuator may be a headlamp low beam leveling actuator for the headlamp 108 and may be configured to initialize a predetermined value for calibration prior to adjustment to a target aim within the acceptable tolerance range of the vehicle longitudinal axis LA.

Referring to FIG. 3, a system 300 for implementing a computer and software-based method to utilize the portable device 110 of FIG. 1 for a calibration level angle determination process 200, such as those shown in FIG. 2, is illustrated as being implemented along with using a graphical user interface (GUI) 324 of the portable device 110, for example. The system 300 includes a communication path 302, one or more processors 304, a memory component 306, a headlamp leveling software application tool 312, a storage or database 314, a sensor 316 that may be, for example, a wireless Bluetooth® sensor, a network interface hardware 318, a network 322, a server 320 that may include a cloud-based server, and the portable device 110. The various components of the system 300 and the interaction thereof will be described in detail below.

In some embodiments, the system 300 is implemented using a wide area network (WAN) or network 322, such as an intranet or the Internet. The portable device 110 may include digital systems and other devices permitting connection to and navigation of the network. The portable device 110 may be a smart mobile device such as a smartphone, a tablet, or a like portable handheld smart device. As a non-limiting example, the portable device 110 may be a smartphone such as the iPHONE or a tablet such as the iPAD, both of which are commercially available from Apple, Inc. of Cupertino, Calif. The lines depicted in FIG. 3 indicate communication rather than physical connections between the various components.

As noted above, the system 300 includes the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the system 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the system 300 includes the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

As noted above, the system 300 includes the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, as noted above, the system 300 comprises the display such as a GUI 324 on a screen of the portable device 110 for providing visual output such as, for example, information, graphical reports, messages, or a combination thereof. The display on the screen of the portable device 110 is coupled to the communication path 302 and communicatively coupled to the processor 304. Accordingly, the communication path 302 communicatively couples the display to other modules of the system 300. The display can include any medium capable of transmitting an optical output such as, for example, a cathode ray tube, light emitting diodes, a liquid crystal display, a plasma display, or the like. Additionally, it is noted that the display or the portable device 110 can include at least one of the processor 304 and the memory component 306. While the system 300 is illustrated as a single, integrated system in FIG. 3, in other embodiments, the systems can be independent systems.

The system 300 may comprise the sensor 316 to transmit a determined calibration level angle for a headlamp to the vehicle to a vehicle headlamp sensor to automatically adjust the angle of the headlamp. Alternatively, a manual adjustment may be made to the headlamps to adjust the angle based on the determined calibration level angle and direction that is determined through the headlamp leveling software application tool 312 of the portable device 110 as described herein. As will be described in further detail below, the processor 304 may process the input signals received from the system modules and/or extract information from such signals. For example, in embodiments, the processor 304 may execute instructions stored in the memory component 306 to implement the calibration level angle determination process 200.

The system 300 includes the network interface hardware 318 for communicatively coupling the system 300 with a computer network such as network 322. The network interface hardware 318 is coupled to the communication path 302 such that the communication path 302 communicatively couples the network interface hardware 318 to other modules of the system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors, machine readable instructions, etc.) to communicate over wired and/or wireless computer networks such as, for example, wireless fidelity (Wi-Fi), WiMax, Bluetooth®, IrDA, Wireless USB, Z-Wave, ZigBee, or the like.

Still referring to FIG. 3, data from various applications running on calibration level angle determination process can be provided from the portable device 110 to the system 300 via the network interface hardware 318. The calibration level angle determination process can be any device having hardware (e.g., chipsets, processors, memory, etc.) for communicatively coupling with the network interface hardware 318 and a network 322. Specifically, the calibration level angle determination process 200 can include an input device having an antenna for communicating over one or more of the wireless computer networks described above.

The network 322 can include any wired and/or wireless network such as, for example, wide area networks, metropolitan area networks, the Internet, an Intranet, satellite networks, or the like. Accordingly, the network 322 can be utilized as a wireless access point by the calibration level angle determination process 200 to access one or more servers (e.g., a server 320). The server 320 and any additional servers generally include processors, memory, and chipset for delivering resources via the network 322. Resources can include providing, for example, processing, storage, software, and information from the server 320 to the system 300 via the network 322. Additionally, it is noted that the server 320 and any additional servers can share resources with one another over the network 322 such as, for example, via the wired portion of the network, the wireless portion of the network, or combinations thereof.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for leveling a headlamp of a vehicle on a ground surface using a portable device, the method comprising:
   determining, by a processor and a leveling software application tool of the portable device removable from the vehicle, a zero reference earth plane of the ground surface on which the vehicle is disposed by generating a tire earth plane position based on positioning of the portable device adjacent to each tire of the vehicle, determining a plane of tire alignment with respect to the ground surface based on each tire earth plane position, and setting the zero reference earth plane to the plane of tire alignment;
   setting the zero reference earth plane as parallel to a vehicle longitudinal axis of the vehicle with respect to the ground surface;
   based on a feedback from the headlamp received by the portable device, determining a current illumination axis of the headlamp; and
   generating a calibration level angle based on a comparison of the vehicle longitudinal axis and the current illumination axis.

2. The method of claim 1, further comprising determining a calibration level angle range based on the calibration level angle and a tolerance with respect to the vehicle longitudinal axis.

3. The method of claim 2, wherein the tolerance is within ±0.15 degrees of the vehicle longitudinal axis.

4. The method of claim 2, wherein the tolerance is within ±1.00 degrees of the vehicle longitudinal axis.

5. The method of claim 2, wherein the tolerance is within a range of +5 cm to −15 cm of the vehicle longitudinal axis.

6. The method of claim 2, wherein the tolerance is within a range of ±10 cm of the vehicle longitudinal axis.

7. The method of claim 2, wherein the tolerance and a nominal aim is predetermined and stored within a database communicatively coupled to the processor of the portable device, and the tolerance and the nominal aim is based on a vehicle type.

8. The method of claim 1, further comprising setting the vehicle longitudinal axis based on a predetermined nominal vertical aim of a desired illumination axis.

9. The method of claim 8, wherein the predetermined nominal vertical aim is −5 cm of horizontal.

10. The method of claim 8, wherein the predetermined nominal vertical aim is −6.4 cm of horizontal.

11. The method of claim 1, further comprising:
   one of automatically or manually adjusting the current illumination axis of the headlamp based on the calibration level angle.

12. The method of claim 1, further comprising:
   determining a calibration level angle range based on the calibration level angle and a tolerance with respect to the vehicle longitudinal axis; and
   one of automatically or manually adjusting the current illumination axis of the headlamp based on the calibration level angle range.

13. The method of claim 12, further comprising:
   transmitting the calibration level angle range to a headlamp leveling actuator coupled to the headlamp; and
   automatically adjusting the current illumination axis of the headlamp based on the calibration level angle range.

14. The method of claim 1, wherein determining the zero reference earth plane further comprises:
   disposing the portable device on the ground surface adjacent the vehicle;
   generating a horizontal plane reading of the portable device; and
   setting the zero reference earth plane to the horizontal plane reading.

15. A system for leveling a headlamp of a vehicle on a ground surface, the system comprising:
   a portable device removable from the vehicle;
   a leveling software application tool installed in the portable device; and
   a processor communicatively coupled to the portable device, the leveling software application tool, and a non-transitory computer storage medium, wherein the non-transitory computer storage medium stores instructions that, when executed by the processor, cause the processor to:
      determine, by the processor and the leveling software application tool of the portable device, a zero reference earth plane of the ground surface on which the vehicle is disposed by generating a tire earth plane position based on positioning of the portable device adjacent to each tire of the vehicle, determining a plane of tire alignment with respect to the ground surface based on each tire earth plane position, and setting the zero reference earth plane to the plane of tire alignment;
      set the zero reference earth plane as parallel to a vehicle longitudinal axis of the vehicle with respect to the ground surface;

based on a feedback from the headlamp received by the portable device, determine a current illumination axis of the headlamp; and generate a calibration level angle based on a comparison of the vehicle longitudinal axis and the current illumination axis.

16. The system of claim 15, further comprising instructions that, when executed by the processor, cause the processor to determine a calibration level angle range based on the calibration level angle and a nominal aim and tolerance with respect to the vehicle longitudinal axis.

17. The system of claim 16, wherein the nominal aim and tolerance is predetermined and stored within a database communicatively coupled to the processor, and the nominal aim and tolerance is based on a vehicle type.

18. The system of claim 16, wherein further comprising instructions that, when executed by the processor, cause the processor to:

transmit the calibration level angle range to a headlamp leveling actuator coupled to the headlamp of the vehicle; and monitor an automatic adjustment by the headlamp leveling actuator of the current illumination axis of the headlamp based on the calibration level angle range.

* * * * *